United States Patent [19]

Prengel et al.

[11] Patent Number: 5,322,561
[45] Date of Patent: Jun. 21, 1994

[54] CONDUCTIVE FLAKY PIGMENTS

[75] Inventors: Constanze Prengel, Nordwijkerhout, Netherlands; Klaus Bernhardt, Gross Umstadt, Fed. Rep. of Germany

[73] Assignee: Merck Patent Gesellschaft Mit Beschrankter Haftung, Darmstadt, Fed. Rep. of Germany

[21] Appl. No.: 985,719

[22] Filed: Dec. 4, 1992

[30] Foreign Application Priority Data

Dec. 6, 1991 [DE] Fed. Rep. of Germany ....... 4140296

[51] Int. Cl.$^5$ .................................................. C09C 1/00
[52] U.S. Cl. .................................. 106/475; 106/415; 106/472; 106/474
[58] Field of Search ................ 106/415, 472, 474, 475

[56] References Cited

U.S. PATENT DOCUMENTS

| | | | |
|---|---|---|---|
| 3,832,208 | 8/1974 | Jackson | 106/308 |
| 3,874,890 | 4/1975 | Bernhard et al. | 106/291 |
| 4,076,551 | 2/1978 | Bernhard et al. | 106/291 |
| 4,086,100 | 4/1978 | Esselborn et al. | 106/291 |
| 4,456,486 | 6/1984 | Bernhard | 106/291 |
| 4,482,389 | 11/1984 | Franz et al. | 106/291 |

*Primary Examiner*—Karl Group
*Assistant Examiner*—Chris Gallo
*Attorney, Agent, or Firm*—Millen, White, Zelano & Branigan

[57] ABSTRACT

The invention relates to conductive flaky pigments for which a flaky substrate has been coated with an electrically conductive layer, characterized in that the conductive layer comprises a metal oxide pigment layer which is interspersed with carbon black particles and which has at the same time been doped with additional metal oxide particles.

7 Claims, No Drawings

CONDUCTIVE FLAKY PIGMENTS

BACKGROUND OF THE INVENTION

The invention relates to conductive flaky pigments for which a flaky substrate has been coated with an electrically conductive layer.

In many areas of industry there is a demand for conductive pigments, for example, for producing electrically conductive, antistatic or electromagnetically shielding plastics, antistatic polymers, paints, coatings, fibers, moldings or the like.

To produce conductive pigments having black or grey shades or metallic effects, large amounts of conductive carbon black are used. In addition, there are a number of metals and oxidic materials, for example, antimony-doped tin dioxide or tin-doped indium oxide, which can be used as such or else as coatings on other pigments or fillers.

However, the pigments thus obtained usually have conductivity values which do not meet the high requirements. Antimony-doped tin dioxide or other conductive metal oxide materials are frequently only of limited usefulness on account of their high specific density. Blends with plastics frequently make the components too heavy, depending on the mixing ratio. For this reason, it would be desirable to have lightweight, conductive pigments, especially in colors other than black.

There is also a demand for pearl luster pigments of improved conductivity.

SUMMARY OF THE INVENTION

It has now been found, surprisingly, that an increase in conductivity is achieved when the conductive layer comprises a metal oxide pigment layer which is interspersed with carbon black particles and at the same time has been doped with additional metal oxide dopant.

The present invention accordingly provides conductive flaky pigments for which a flaky substrate has been coated with an electrically conductive layer, characterized in that the conductive layer comprises a metal oxide pigment layer which is interspersed with carbon black particles and which at the same time has been doped with additional metal oxide dopant.

The present invention also provides a process for preparing the conductive flaky pigments according to the invention, characterized in that an aqueous suspension of flaky substrate is prepared and then a solution of metal salt is added simultaneously with, but separately from, an aqueous carbon black particle suspension, the doping metal oxide dopant either being present as finely dispersed metal oxide particles in the carbon black particle suspension or likewise being present as a dissolved metal salt in the metal salt solution and being coprecipitated, and in that the pH of the substrate suspension is maintained, by simultaneous addition of a base, within a range which brings about a metal salt hydrolysis, so that the added particles are entrained, and in that the coated substrate is separated off, optionally washed and then dried and calcined.

The present invention also provides for the use of the conductive flaky pigments according to the present invention in formulations such as paints, inks, moldings or plastics.

The present invention also provides formulations which contain the pigments according to the present invention.

The present invention further provides for the use of the pigments according to the present invention as filler material in plastics. This makes it possible to prepare plastics of variable resistance. The present invention therefore also provides plastics of variable resistance which contain pigments according to the present invention as filler material.

As flaky substrate, it is possible in principle to use any flaky materials, for example, phyllosilicates, flaky oxides or metal flakes and also metal oxide-coated flaky materials. Of particular suitability are mica, talc, kaolin, bismuth oxychloride or flaky iron oxide and mica coatings with colored or colorless metal oxides such as $TiO_2$, $Fe_2O_3$, $SnO_2$, $Cr_2O_3$, $ZnO$ and other metal oxides, alone or mixed in a single layer or in successive layers. These pigments, which are known as pearl luster pigments, are described, for example, in the U.S. Pat. Nos. 3,832,208, 3,874,890, 4,086,100, 4,456,486, and 4,482,389.

Many of these pigments are commercially available or can be prepared by known methods.

The flaky substrates should remain stable at high temperatures and advantageously be present in a finely divided form, i.e., in particle sizes of about 0.5–1000 μm. The flaky material used is preferably mica.

A process for preparing carbon black-containing pigments is known, for example, from DE-A-41 04 846 (corresponding to U.S. Ser. No. 07/834,960, filed Feb. 14, 1992). The process described there comprises preparing an aqueous substrate suspension and then adding a solution of at least one metal salt, the carbon black either having been finely dispersed in the substrate suspension or in the metal salt solution or being added separately as an aqueous carbon black dispersion to the substrate suspension at the same time as the metal salt solution and the pH of the substrate suspension being maintained, by the simultaneous addition of a base, within a range which effects metal salt hydrolysis, separating off the so coated substrate, washing, drying and calcining at 700°–900° C. in the absence of oxygen.

A further process was described even earlier in U.S. Pat. No. 4,076,551. In this process, first a substrate dispersion is mixed with a carbon black dispersion. A metal salt solution is added under hydrolysis conditions to precipitate a carbon black-containing metal hydroxide layer onto the substrate. The products produced in this way are separated off and dried at 110°–130° C.

The conductive pigments according to the present invention are prepared on the lines of the above-described processes. The process according to the present invention comprises preparing an aqueous suspension of flaky substrate and then adding a solution of at least one metal salt at the same time as, but separately from, an aqueous carbon black particle suspension and maintaining the pH of the substrate suspension, through the simultaneous addition of a base within a range which brings about a metal salt hydrolysis. The doping metal oxide particles can be present either as metal oxide particles in fine dispersion in the carbon black particle suspension or dissolved as a metal salt in the actual metal salt solution and be coprecipitated therefrom.

The substrate thus coated is separated off, optionally washed and then dried and calcined.

Prior to the just-described process according to the invention, any other metal oxide layer may, of course, be precipitated onto the substrate in a conventional manner. This can be extremely desirable for obtaining certain colors.

As doping metal oxides, it is preferable to use $Al_2O_3$ or $SiO_2$. The proportion thereof is 0.2–10% by weight, preferably 0.5–6% by weight, based on the total weight of conductive flaky pigment. The particle size is 5–50 nm, preferably 10–30 nm. The amount of metal oxide pigment layer, based on the total weight of conductive flaky pigment, is preferably 20–50 wt.%, especially 25–40 wt.%.

The choice of carbon black or carbon black dispersion is not very critical; it is thus possible, for example, to use any commercially available carbon black or carbon black dispersion (for example, from Degussa, Germany) or any other carbon black or carbon black dispersion.

The primary particle size is preferably 5–200 nm, in particular 10–100 nm. The carbon black content, based on the total weight of conductive flaky pigment, is 1–10% by weight.

The amount of flaky substrate relative to the amount of total weight of the conductive flaky pigment applied thereto is preferably 50–<100 wt.%, especially 60–80 wt.%.

The metal salts used are, in particular, salts of aluminum, titanium, zirconium, chromium, iron, nickel, cobalt and/or tin. The particularly preferred metal oxide pigment layer is $TiO_2$.

The flaky pigments according to the invention exhibit improved conductivity. Preferably, the pigments have a specific resistance of about 100 kohm×cm – 10 Mohm×cm, especially 200 kohm×cm – 2 Mohm×cm.

The individual process parameters for the coating operation, i.e., for the metal salt hydrolysis, are of the conventional kind and have been described at length, for example, in U.S. Pat. No. 4,076,551. All other parameters, for example, particle sizes, metal salt concentrations, temperatures and preferred embodiments, may likewise be taken, for example, from U.S. Pat. No. 4,076,551.

After the so-prepared products have been separated off, washed and dried, they are finally calcined at a temperature of 700°–1000° C., preferably 700°–900° C. The calcination temperature depends in general on the metal hydroxide and the precipitated layer thickness; the calcination time may range from a few minutes to several hours, but especially between 20 and 120 minutes.

The conductive layer of the products prepared according to the invention thus comprises a metal oxide pigment matrix (for example, $TiO_2$, $SnO_2$, $Fe_2O_3$ or else $FeTiO_5$) which is interspersed with carbon black particles and into which metal oxide particles such as $Al_2O_3$ or $SiO_2$ have been embedded at the same time.

As a result of the incorporation of the metal oxide particles $SiO_2$ or $Al_2O_3$, the conductive flaky pigments according to the invention surprisingly exhibit a much improved conductivity. Furthermore, they are light in weight, preparable in shades from black to pale and silvery grey, and are readily variable in specific resistance as desired.

They are thus highly suitable for preparing electrically conductive, antistatic or electromagnetically shielding, antistatic polymers; they are also used in formulations such as paints, moldings or inks. They are similarly highly suitable for use as filler material in plastics.

The invention will now be more particularly described in non-limiting examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 41 40 296.0, are hereby incorporated by reference.

EXAMPLES

Measuring Arrangement

The specific resistances of the pigments prepared according to the present invention are measured in the following measuring arrangement:

In an acrylic glass tube having an internal diameter of d=1 cm, about 0.5 g of pigment is compressed with the aid of two metal plungers, provided with a weight of 10 kg, and the electrical resistance R appearing between these metal plungers is measured. Given knowledge of the layer thickness L of the compressed pigment, the specific resistance q follows from the formula $$q = R \cdot \frac{(d/2)^2 \cdot \pi}{L} \text{ [ohm} \cdot \text{cm]}$$

EXAMPLE 1

50 g of N-mica are suspended in 1 l of fully demineralized water and heated to 75° C. 25 ml of 0.136 molar $SnCl_4$ solution are metered in over 35 min. On completion of the addition of the $SnCl_4$ solution, the suspension is stirred for 10 min. to complete the precipitation reaction. Then a suspension of 7.5 g of Derussol ® A dispersion (from Degussa) and - separately but simultaneously - 112.5 ml of a solution of 2 g of $AlCl_3 \cdot 6 H_2O$ in aqueous $TiCl_4$ solution (428 g of $TiCl_4$/l) are metered in to the reaction suspension over a period of 90 min. In the course of this period, very fine "$Al_2O_3$" is precipitated as well as titanium hydroxide. During the addition, the pH is maintained at a constant 1.8 with aqueous 32% NaOH solution.

On completion of the addition, 10 ml of pure $TiCl_4$ solution are added. The reaction suspension is subsequently stirred for 15 min. with slow cooling. The pigment is washed with fully demineralized water, dried at 120° C. for 16 hours and then calcined at 850° C. in an $N_2$ stream for 45 min.

The pigment contains 1% of $SnO_2$, 2.3% of carbon black, 0.84% of $Al_2O_3$ and 58% of $TiO_2$.

Specific resistance, measured on powder: 2 Mohm×cm

EXAMPLE 2

100 g of N-mica are suspended in 2 l of fully demineralized water and heated to 75° C. 50 ml of aqueous 0.136 molar $SnCl_4$ solution are metered into the reaction mixture in the course of 45 min. On completion of the addition, the suspension is stirred for 10 min. to complete the precipitation reaction. Then a suspension of 15 g of Derussol® A dispersion (from Degussa) and 5.6 g of Aerosil 200® (from Degussa) in 200 ml of fully demineralized water are added to the reaction mixture in the course of 15 min. At the same time, but separately, 220 ml of aqueous TiCl$_4$ solution (428 g of TiCl$_4$/l) are metered in over a period of 30 min. During the addition, the pH is kept at a constant 1.8 with aqueous 32% NaOH solution. On attainment of the desired color, in this case silvery grey, the addition of the TiCl$_4$ solution is terminated. The pigment suspension is filtered, the filter residue is washed with fully demineralized water, and the pigment is dried at 120° C. for 16 hours. Then, the pigment is calcined at 850° C. in an N$_2$ stream for 45 min.

The pigment contains 1% of SnO$_2$, 2.3% of carbon black, 6% of Aerosil 200 and 40% of TiO$_2$.

Specific resistance, measured on powder: 2 Mohm×cm

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing a conductive flaky pigment comprising:
    preparing an aqueous suspension of flaky substrate;
    adding to said aqueous suspension of flaky substrate a solution of at least one metal salt simultaneously with, but separately from, an aqueous carbon black particle suspension, said aqueous carbon black particle suspension and/or said metal salt solution further containing, respectively, metal oxide dopant as finely dispersed metal oxide particles or as a dissolved metal salt to be coprecipitated;
    maintaining the pH of the resultant suspension, by simultaneous addition of a base, within a range which brings about metal salt hydrolysis, whereby said substrate is coated with a conductive layer in which the carbon black particles and metal oxide dopant are entrained; and
    separating off the resultant coated substrate, and optionally washing, drying and calcining said resultant coated substrate.

2. A process according to claim 1, wherein the amount of metal oxide dopant in said resultant coated substrate is 0.2–10 wt.%, based on total pigment weight, and the amount of metal oxide pigment layer is 20–50 wt.%, based on total pigment weight.

3. A process according to claim 2, wherein mica flakes are used as said flaky substrate.

4. A process according to claim 2, wherein, prior to actual precipitation of said conductive layer onto said substrate, at least one other metal oxide layer is precipitated onto said substrate.

5. A process according to claim 2, wherein the metal salt used is TiCl$_4$ and the metal oxide dopant is Al$_2$O$_3$ or SiO$_2$.

6. A process according to claim 2, wherein calcining is effected at a temperature of 700°–1000° C. in the absence of oxygen.

7. A process for preparing a conductive flaky pigment comprising:
    coating a flaky substrate with a conductive layer, said layer comprising a metal oxide pigment layer with interspersed carbon black particles and doped with metal oxide dopant, wherein said coating is performed by maintaining the pH of a suspension containing a solution of at least one metal salt, carbon black particles, and metal oxide dopant, through simultaneous addition of a base, within a range which brings about metal salt hydrolysis, wherein the amount of metal oxide dopant in the resultant coated substrate is 0.2–10 wt.%, based on total pigment weight, and the amount of metal oxide pigment layer is 20–50 wt.%, based on total pigment weight.

* * * * *